US008405785B1

(12) United States Patent
Auld et al.

(10) Patent No.: US 8,405,785 B1
(45) Date of Patent: Mar. 26, 2013

(54) SYSTEM AND METHOD FOR INTEGRATED TIMING CONTROL FOR AN LCD DISPLAY PANEL

(75) Inventors: David Auld, San Jose, CA (US); Lei He, Fremont, CA (US); Chen Chen, San Jose, CA (US); Gerard Kuang-Chang Yeh, Redwood City, CA (US)

(73) Assignee: CSR Technology Inc., Sunnyvale, CA (US)

( * ) Notice: Subject to any disclaimer, the term of this patent is extended or adjusted under 35 U.S.C. 154(b) by 526 days.

(21) Appl. No.: 12/547,143

(22) Filed: Aug. 25, 2009

Related U.S. Application Data

(60) Provisional application No. 61/096,623, filed on Sep. 12, 2008.

(51) Int. Cl.

| | |
|---|---|
| ***H04N 3/14*** | (2006.01) |
| ***G09G 3/20*** | (2006.01) |
| ***G09G 5/00*** | (2006.01) |
| ***G06F 3/038*** | (2006.01) |
| ***G06K 9/36*** | (2006.01) |

(52) U.S. Cl. .......... 348/790; 348/792; 345/55; 345/204; 345/213; 382/166

(58) Field of Classification Search ........................ None
See application file for complete search history.

(56) References Cited

U.S. PATENT DOCUMENTS

| | | | | |
|---|---|---|---|---|
| 6,992,508 | B2 | 1/2006 | Chow | |
| 2004/0233190 | A1 * | 11/2004 | Chow | 345/204 |
| 2006/0092100 | A1 * | 5/2006 | Chou | 345/55 |
| 2006/0222241 | A1 * | 10/2006 | Sasaki | 382/166 |
| 2007/0133413 | A1 | 6/2007 | Pepperell | |
| 2008/0143698 | A1 * | 6/2008 | Lee et al. | 345/204 |
| 2008/0225036 | A1 * | 9/2008 | Song et al. | 345/213 |

* cited by examiner

*Primary Examiner* — Jefferey Harold
*Assistant Examiner* — Sean Haiem
(74) *Attorney, Agent, or Firm* — Lando & Anastasi, LLP

(57) ABSTRACT

A television display system including a display system controller, a transmitter, and an integrated timing controller. The display system controller receives pixel data and pixel timing and control data, and responsive to a pixel data format corresponding to a selected communication standard of a plurality of communication standards that includes LVDS and at least one of RSDS and mini-LVDS, provides formatted pixel data formatted according to the pixel data format of the selected communication standard. The transmitter receives the formatted pixel data, and transmits the formatted pixel data for receipt according to a pixel data rate corresponding to the selected communication standard. The integrated timing controller receives the pixel timing and control data, and responsive to the selected communication standard being one of RSDS and mini-LVDS, generates pixel display timing and control signals to display the formatted pixel data at the pixel data rate corresponding to the selected communication standard on a television display.

22 Claims, 12 Drawing Sheets

| Requirements for Differential Signaling Standards | | | |
|---|---|---|---|
| | LVDS | RSDS | Mini-LVDS |
| $V_{OD}$ | 247/454mV (min/max) | 200mV (nominal) | 300/600mV (min/max) |
| $V_{OS}$ | 1.125/1.375V (min/max) | 1.3 V (nominal) | 1/1.4V (min/max) |
| $I_{OUT}$ | 3.5mA (nominal) | 2mA (nominal) | 4mA (nominal) |

| Signal Name | Alternate Names | Function Description |
| --- | --- | --- |
| Column/Source Driver Control Signals | | |
| RVS | REV<br>POL | Reverse/polarity control. Sets the polarity of the source driver data driving. |
| TP | LOAD | Transfer/load pulse. The rising edge of the TP transfers the data in the source drive to the panel. |
| STH1 | | Start pulse horizontal. Specifies the location of the first pixel during loading. |
| STH2 | | Start pulse horizontal for send half line. Specifies the location of the first pixel of send half of source driver loading if needed. |
| Row/Gate Driver Control Signals | | |
| CPV1 | | Clock pulse vertical. Advance the gate driver to the next row. |
| CPV2 | | Second CPV if needed. |
| OE1 | ROE | Gate driver/row output enable. |
| OE2 | | Second OE if needed. |
| STV1 | | Start pulse vertical. Specifies the location of the first line during loading. |
| STV2 | | Second STV if needed. |

930 (Column/Source Driver Control Signals)

940 (Row/Gate Driver Control Signals)

FIG. 11

SYSTEM AND METHOD FOR INTEGRATED TIMING CONTROL FOR AN LCD DISPLAY PANEL

CROSS REFERENCE TO RELATED APPLICATIONS

This application claims priority under 35 U.S.C. 119(e) to U.S. Provisional Application Ser. No. 61/096,623 entitled "Integration of Differential Signal Transmission Interfaces with a Panel Timing Controller in System on Chip (SOC) Applications" filed Sep. 12, 2008, which is incorporated herein by reference in its entirety.

BACKGROUND OF THE INVENTION

1. Field of the Invention

The present invention is directed to liquid crystal display panels. More particularly, methods and systems relating to differential signaling and timing controls for a liquid crystal display panel are provided.

2. Discussion of the Related Art

Liquid crystal display (LCD) panels are used in a wide range of electronic products, including computers, monitors, flat panel displays, and televisions, among others. LCD displays are matrices of liquid-filled cells that form pixels. LCD panels offer the high resolution, refresh rates, and response times necessary for high-definition viewing of software, graphics, videos, and other media.

LCD panels are typically controlled by display system controllers that are responsible for receiving image data from a graphics card, a video controller, a DVD player, etc., and sending it to an external panel timing controller. Some display system controllers may include additional functionality, such as the SupraHD® 780 processor from Zoran Corporation of Sunnyvale Calif., which integrates a display system control processor with an MPEG-2 decoder, an 8VSB demodulator, NTSC video decoder, HDMI interface, low-voltage differential signaling (LVDS) drivers, memory, and other peripherals to provide a single-chip HDTV controller capable of driving various LCD panels. In such systems, the external panel timing controller may transmit the image data to the LCD panel for display. The external panel timing controller may also generate and send complex timing and control signals to ensure that the image data is displayed at the correct time.

Many LCD panels use some form of differential signaling for interaction between the display system controller, external panel timing controller, and the LCD panel itself. Differential signaling is a form of serial communication performed by sending low-voltage electrical pulses over a pair of electrically-coupled wires. An example of a typical differential signal transmission interface 10 is shown in FIG. 1. A driver 12 sends complementary electrical pulses through the wires 14, 16 connected to a receiver 20. These pulses are signals of opposite polarity: an inverted output and a non-inverted output. For example, the inverted output sends out a high to low transmission, while the non-inverted sends out a low to high transmission. Because the differential signals are equal and opposite, they combine to zero and there is no return signal through any other path, particularly through ground. Prior to reaching the receiver 20, the electric pulse is also conducted through a termination resistor 18, which prevents reflections from occurring at the end of the line. Thus, the receiver 20 can compare the difference in voltage between the electric pulses on wires 14 and 16 and, depending on which one is higher, identify the signal as one of a logical high or low (1 or 0). If the signals are not exactly equal and opposite, to ensure that the pulse does not continue to travel through the system and interfere with subsequent pulses, any remaining voltage may then be conducted through and absorbed by a termination resistor 18, before reaching the driver 12.

Differential signaling offers many benefits in the context of LCD panels. First, the balanced differential lines represented by wires 14, 16 have equal but opposite currents, called odd-mode signals. These odd-mode signals tend to cancel each other out, resulting in low electromagnetic interference. Furthermore, the relatively low voltage reduces the signal swing, allowing for communication speeds of over 5 Gigabits per second (Gbps). Using low voltage signals is possible with differential signaling because any electromagnetic "noise" in the form of inductive radiation from nearby components or electrical fields will affect both lines equally, thereby not affecting the voltage difference between the lines. By contrast, single line transmissions must generate a voltage high enough to overcome this background noise. The low power consumption required for differential signaling allows for the integration of many differential signaling channels on a microchip without generating excessive heat or noise.

Several standards implementing differential signaling are known in the art. Such standards include Low-Voltage Differential Signaling (LVDS), mini-LVDS, Reduced-Swing Differential Signaling (RSDS), and Bussed Low-Voltage Differential Signaling (BLVDS). Standard values for the differential output voltage swing, offset voltage, and output currents for LVDS, RSDS, and mini-LVDS are shown in FIG. 2. These standards may differ from one another as to the expected voltage difference, or "swing"; the amount of voltage applied to a single side; and the number of bits that are sent per clock cycle. For example, LVDS is transmitted at a rate of 7 bits per clock cycle, whereas RSDS and mini-LVDS are transmitted at a rate of 2 bits per clock cycle.

The components in LCD panels may utilize several of these standards. For example, the display system controller may transmit image data and timing signals to the external panel timing controller using an LVDS interface. The external panel timing controller may then send the image data to the panel according to the RSDS or mini-LVDS standards.

SUMMARY OF THE INVENTION

The present invention eliminates the need for an external, dedicated panel timing controller (TCON) in LCD panels. In the past, a customized external panel timing controller typically was designed and developed for each LCD display panel. When a new LCD display panel was developed, the signal and timing requirements would be carefully measured, and a custom external panel timing controller chip would be developed for the LCD display panel. As the timings were fine-tuned during the development process, numerous iterations of the external panel timing controller had to be designed and tested before the optimal settings were determined. Since every LCD display panel's particular dimensions and timing needs were different, substantial research and development was required to develop a dedicated external panel timing controller for each new LCD display panel that was developed.

Embodiments of the present invention eliminate the need for a dedicated external panel timing controller by providing a programmable generic panel timing controller that can be configured, through the use of parameters and logic gates, to generate correct timing signals for a variety of LCD panels. In this way, design and development costs can be reduced.

Embodiments of the present invention thus simplify the design of display systems by eliminating the need for external panel timing controllers. In accordance with one embodiment, an integrated circuit (a "system on a chip") is provided that incorporates a data framer, a data transmitter, and a programmable timing controller. The data framer may be configured to format the data according to one of the LVDS, RSDS, or mini-LVDS transmission standards. The data is then passed to the data transmitter, which sends the data to components on the LCD panel responsible for displaying pixels at the appropriate time. Embodiments of the present invention further simplify the design of display systems by providing a display system controller with common output interface whereby data can be transmitted according to one of the LVDS, RSDS, or mini-LVDS standards. This eliminates the need for an external timing controller, in that the display system controller can generate pixel data in the RSDS or mini-LVDS standards, as well as the necessary timing signals, and transmit them to the column and gate drivers that control the display of pixels on the panel. However, where an external timing controller is desired or necessary, for example, to provide backwards compatibility or to drive a larger high-definition panel, the display system controller can transmit data to the external timing controller according to the LVDS standard.

According to one aspect of the present invention, a television display system is provided. The television display system comprises a display system controller, a transmitter, and an integrated timing controller. The display system controller is configured to receive pixel data and pixel timing and control signals, and responsive to a pixel data format corresponding to a selected communication standard of a plurality of differential signaling communication standards that includes LVDS and at least one of RSDS and mini-LVDS, to provide formatted pixel data that is formatted according to the pixel data format of said selected communication standard. The transmitter is configured to receive the formatted pixel data, and to transmit the formatted pixel data for receipt according to a pixel data rate corresponding to said selected communication standard. The integrated timing controller is configured to receive the pixel timing and control data, and responsive to said selected communication standard being one of RSDS and mini-LVDS, to generate pixel display timing and control signals to display the formatted pixel data at the pixel data rate corresponding to said selected communication standard on a television display.

In accordance with one embodiment, the display system controller, the transmitter, and the integrated timing controller are implemented on a single integrated circuit. In a further embodiment, the plurality of differential signaling communication standards includes LVDS, RSDS, and mini-LVDS.

In accordance with an aspect of this embodiment, the transmitter includes a plurality of drivers. The plurality of drivers includes a first plurality of channel drivers that are configured to transmit the formatted pixel data for receipt according to the pixel data rate of LVDS responsive to LVDS being said selected communication standard and to transmit instead the formatted pixel data for receipt according to the pixel data rate of RSDS and mini-LVDS responsive to one of RSDS and mini-LVDS being said selected communication standard.

In accordance with a further aspect of this embodiment, the plurality of drivers includes at least one clock driver. The at least one clock driver is configured to transmit a clock signal having a clock rate that is either one seventh or one eighth the pixel data rate of LVDS responsive to any one of LVDS, RSDS and mini-LVDS being said selected communication standard.

In accordance with another aspect of this embodiment, the television display system further comprises a data framer. The data framer is configured to receive the pixel data and the pixel timing and control signals, and to format the pixel data along with the pixel timing and control signals according to the pixel data format of LVDS responsive to LVDS being said selected communication standard, and to receive the pixel data and the pixel timing and control signals and to format only the pixel data according to the pixel data format of RSDS and mini-LVDS responsive to the selected one of RSDS and mini-LVDS being said selected communication standard.

In accordance with a further aspect of the present invention, the data framer is further configured to repeat each bit of the pixel data during formatting of the pixel data according to the pixel data format of RSDS and mini-LVDS responsive to the selected one of RSDS and mini-LVDS being said selected communication standard.

In accordance with an embodiment of the present invention, the integrated timing controller includes a counter circuit and a plurality of programmable timing control circuits. The counter receives the pixel timing and control signals and provides a line count signal and a pixel count signal, the line count signal identifying a line of the television display at which the formatted pixel data is to be displayed and the pixel count signal identifying pixel position of the television display at which the formatted pixel data is to be displayed. Each of the plurality of programmable timing control circuits is coupled to the counter circuit to receive the line count signal and the pixel count signal. The plurality of programmable timing control circuits includes a first plurality of programmable timing control circuits for respectively providing a respective one of a plurality of source driver timing and control signals to the television display based upon the line count signal and the pixel count signal, and a second plurality of programmable timing control circuits for respectively providing a respective one of a plurality of gate driver timing and control signals to the television display based upon the line count signal and the pixel count signal. In accordance with a further aspect of this embodiment, at least one of an assertion level, an assertion time, and an assertion width of each respective one of the plurality of source driver timing and control signals and each respective one of the plurality of gate driver timing and control signals is programmable.

In accordance with another aspect of the present invention, a method of displaying an image is provided. The method comprises acts of receiving pixel data and pixel timing and control signals corresponding to the image; formatting, responsive to selection of a communication standard from a plurality of differential signaling communication standards that includes LVDS and a least one of RSDS and mini-LVDS, the pixel data according to a pixel data format of said selected communication standard; transmitting the formatted pixel data for receipt according to a pixel data rate corresponding said selected communication standard; and generating, responsive to said selected communication standard being one of RSDS and mini-LVDS, pixel display timing and control signals to display the formatted pixel data at the pixel data rate corresponding to said selected communication standard on a television display.

In accordance with one embodiment of the present invention, the act of formatting includes an act of formatting, responsive to selection of the communication standard from a plurality of differential signaling communication standards that includes LVDS, RSDS, and mini-LVDS, the pixel data according to a pixel data format of said selected communication standard.

In accordance with another embodiment, the act of transmitting includes acts of transmitting the formatted pixel data for receipt according to the pixel data rate of LVDS in response to LVDS being said selected communication standard, and transmitting the formatted pixel data for receipt according to the pixel data rate of RSDS and mini-LVDS in response to one of RSDS and mini-LVDS being said selected communication standard.

In accordance with further embodiment, the act of transmitting the formatted pixel data for receipt according to the pixel data rate of LVDS in response to LVDS being said selected communication standard includes transmitting a first portion of the formatted pixel data for receipt according to the pixel data rate of LVDS using a first channel driver, and the act of transmitting the formatted pixel data for receipt according to the pixel data rate of RSDS and mini-LVDS in response to one of RSDS and mini-LVDS being said selected communication standard includes transmitting a second portion of the formatted pixel data for receipt according to the pixel data rate of RSDS and mini-LVDS using the first channel driver.

In accordance with another aspect of the present invention, the method further comprises an act of transmitting a clock signal having a clock rate that is either one seventh or one eighth the pixel data rate of LVDS in response to any one of LVDS, RSDS and mini-LVDS being said selected communication standard.

In accordance with one embodiment, the act of formatting the pixel data according to a pixel data format of said selected communication standard includes acts of formatting the pixel data along with the pixel timing and control signals according to the pixel data format of LVDS in response to LVDS being said selected communication standard, and formatting only the pixel data according to the pixel data format of RSDS and mini-LVDS in response to the selected one of RSDS and mini-LVDS being said selected communication standard.

In accordance with another embodiment of the present invention, the act of formatting only the pixel data includes an act of repeating each bit of the pixel data a plurality of times during the act of formatting only the pixel data to provide an effective pixel data rate that is received according to the pixel data rate of RSDS and mini-LVDS.

In accordance with yet another aspect of the present invention, the method further comprises an act of receiving a plurality of parameters corresponding to a viewable area of the television display, wherein the act of generating includes an act of generating, responsive to said selected communication standard being one of RSDS and mini-LVDS, the pixel display timing and control signals to display the formatted pixel data at the pixel data rate corresponding to the selected communication standard on a television display based upon the plurality of parameters corresponding to the viewable area of the television display.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. In the figures, each identical or nearly identical component that is illustrated in various figures is represented by a like numeral. For purposes of clarity, not every component may be labeled in every figure. In the drawings:

FIG. 11 depicts the timing/control signals that may be provided by the integrated timing controller of FIG. 9;

DETAILED DESCRIPTION

Figures 1, 2:
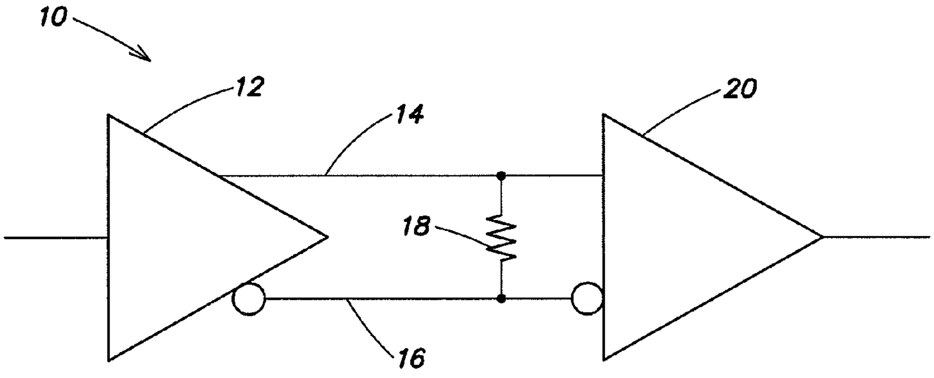
FIG. 1 is a functional block diagram illustrating a typical point-to-point differential signal transmission interface capable of communicating using LVDS, RSDS, and mini-LVDS interface standards.
FIG. 2 is a table showing voltage and current requirements for LVDS, RSDS, and mini-LVDS interface standards.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter and equivalents thereof as well as additional items.

Figure 3:
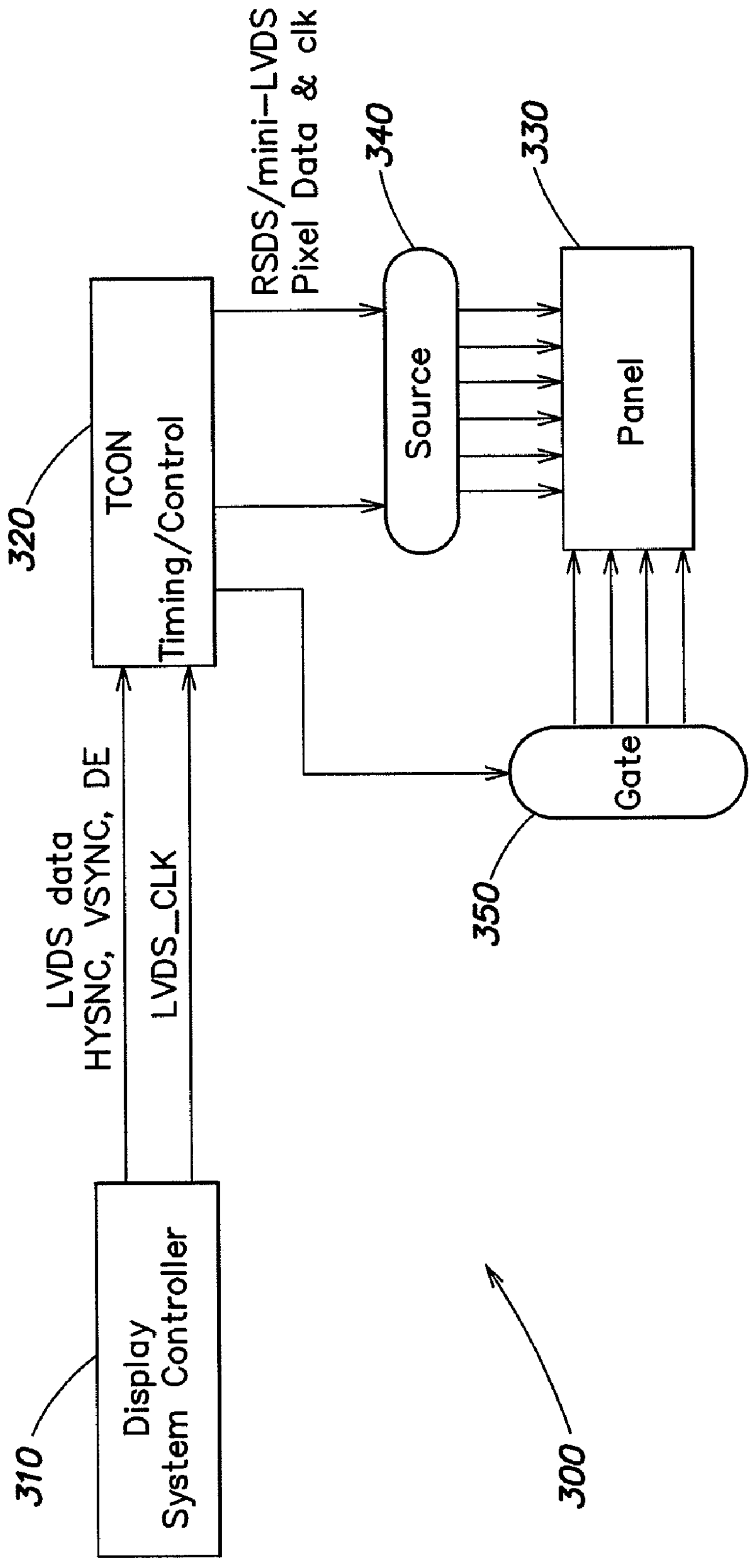
FIG. 3 is a functional block diagram of an LCD display system that includes a display system controller and an external timing controller.

In many LCD panels, the LVDS communication standard is used to transfer data between subsystems on the panel. For example, some display system controllers use LVDS to send pixel data, such as RGB color values, to an external panel timing controller. The external panel timing controller will generate the timing/control signals necessary to display the pixel on the LCD panel. Such systems incorporating external timing controllers are known in the art, such as the previously mentioned SupraHD® 780 integrated HDTV LCD display control processor, an example of which is functionally depicted in FIG. 3. In LCD display system 300, a display system controller 310 typically sends an LVDS clock (LVDS_CLK) signal as well as the LVDS pixel data and timing/control signals to synchronize or otherwise coordinate the actions of two or more circuits. In the present context, the display system controller 310 may send an LVDS clock signal to an external panel timing controller (TCON) 320 to indicate that a particular number of bits have been sent. The LVDS standard operates at a rate of 7 bits per clock cycle, meaning that every clock signal from the display system controller 310 indicates to the panel timing controller 320 that 7 bits have been sent since the last clock signal. The display system controller 310 may also send to the external panel timing controller 320 other timing/control signals that are known in the art, such as Horizontal Synchronization signals (HSYNC), Vertical Synchronization signals (VSYNC), and Data Enable (DE) signals.

The pixel data in the LVDS standard and the associated timing/control signals may be used by the external panel timing controller 320 to generate complex timing schemes according to which the pixel data should be displayed on the LCD panel 330. The behavior of each column and row in LCD panel 330 is driven by a respective source driver 340 and a gate driver 350, respectively. Thus, the timing/control schemes generated by the external panel timing controller 320 are transmitted to the source drivers 340 and gate drivers 350. These timing/control schemes may include delay durations that indicate the number of clock cycles that a source driver 340 or gate driver 350 should wait before displaying some particular pixel data on the LCD panel 330. The pixel data itself is typically sent from the external panel timing controller 320 to the source drivers 340 at the panel 330 through the use of a differential signaling interface other than LVDS, for example, RSDS or mini-LVDS. Both the RSDS and mini-LVDS standards operate at a rate of 2 bits per clock cycle, a different rate than the 7 bits per clock cycle used in the LVDS transmission standard.

Figure 4:
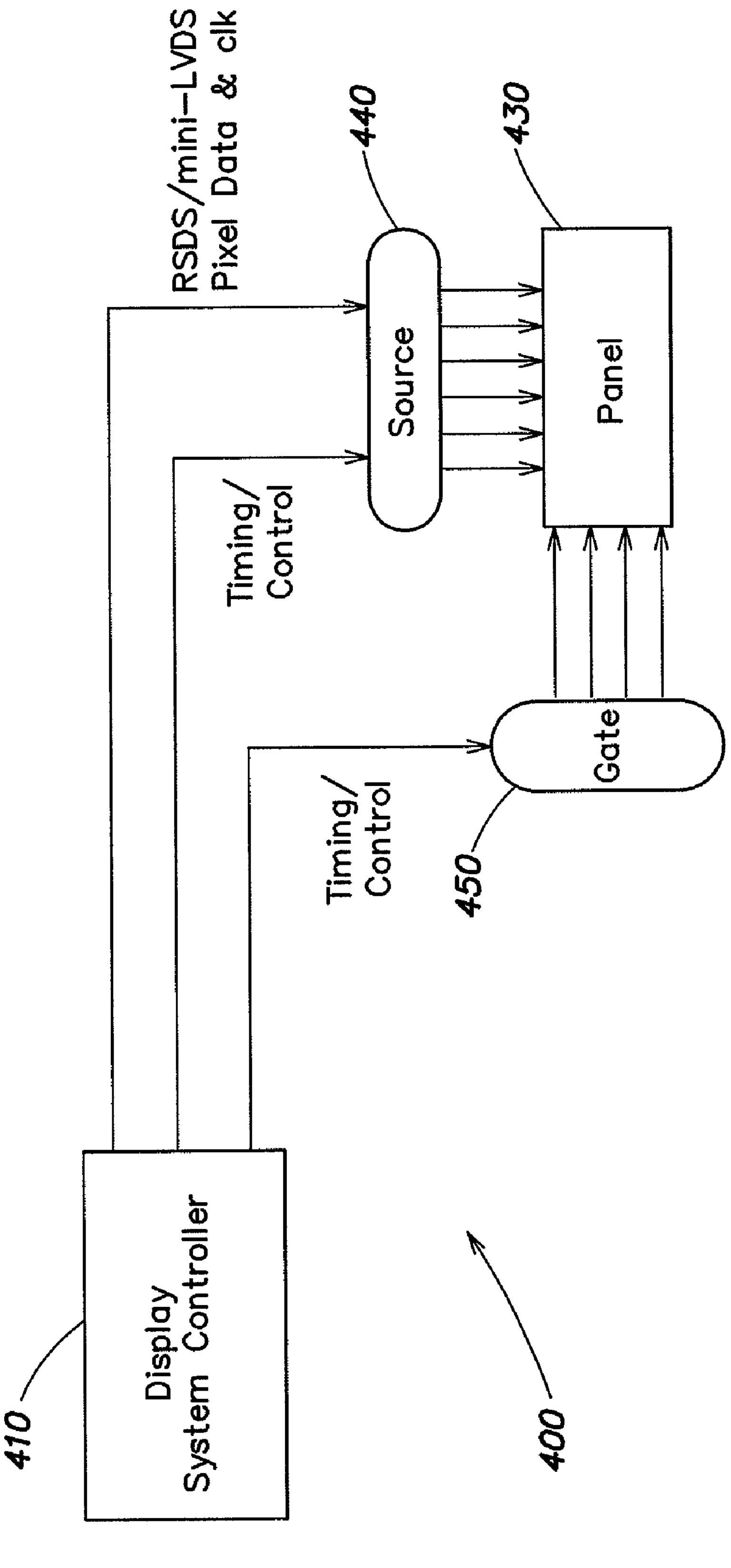
FIG. 4 is a functional block diagram of an LCD display system that includes a display system controller with an integrated panel timing controller according to an embodiment of the present invention.

Embodiments of the present invention eliminate or reduce the cost and complexity associated with an external panel timing controller by providing a display system controller that is capable of both generating timing/control signals and transmitting pixel data according to one of LVDS, RSDS, and mini-LVDS standards. A system 400 in accordance with one such embodiment is illustrated in FIG. 4. In system 400, a display system controller 410 is provided, the display system controller 410 being electronically coupled to and configured to receive image data from a graphics card, memory, a set top box, a DVD player, or other video input apparatus (not shown). The display system controller 410 may be configured to generate or "pack" pixel data such that the data can be transmitted according to a particular transmission standard, for example, LVDS, RSDS, or mini-LVDS. Where the display system controller 410 is configured to transmit in the RSDS or mini-LVDS standards, the pixel data may be sent directly to the source drivers 440. The display system controller 410 may further generate a timing/control scheme for controlling the LCD panel 430 and transmit the timing/control signals to the source drivers 440 and the gate drivers 450, thereby eliminating the need for an external panel timing controller. However, it may be desired or necessary that the display system controller 410 be incorporated into a system having an external panel timing controller, such as the external panel timing controller 320 in system 300 in FIG. 3. Therefore, the display system controller 410 can be configured to generate and transmit LVDS pixel and clock data and accompanying control data, such as HSYNC, VSYNC, and DE, to the external panel timing controller 320 according to the LVDS standard. In this configuration, the display system controller 410 performs a function similar to that performed by the display system controller 310 seen in FIG. 3. Thus, the display system controller 410 can be configured to be compatible with a variety of LCD panel display systems, whether those systems incorporate an external timing controller or not.

Figure 5:
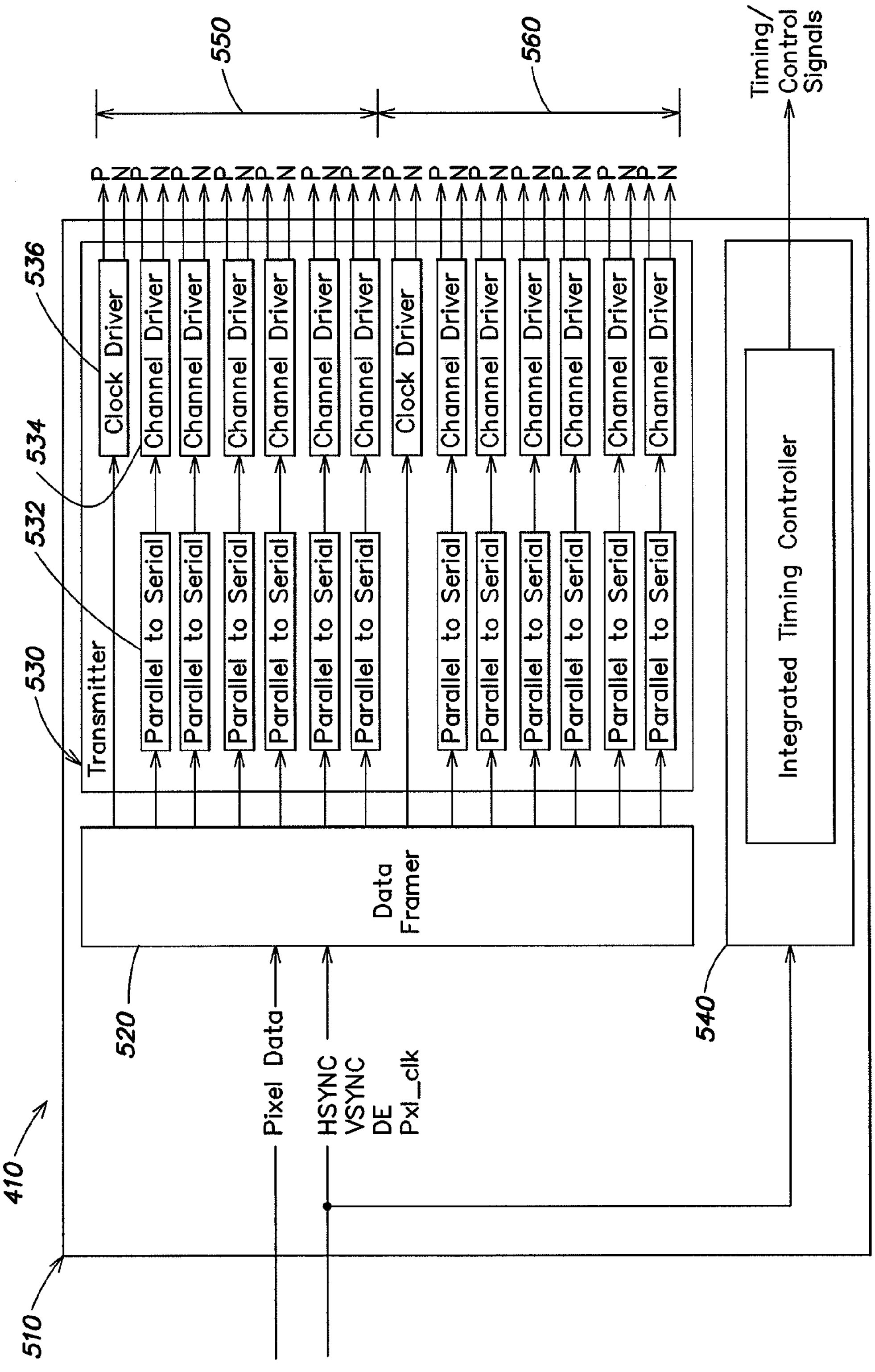
FIG. 5 is an expanded functional block diagram of a portion of the display system controller of FIG. 4.

The components of the display system controller 410 in an exemplary embodiment can be seen in FIG. 5. It should be appreciated that in FIG. 5, those components that receive the video input, decode or otherwise process the video input and generate pixel data and HSYNC, VSYNC, and DE signals are not shown, so as not to obscure the present invention. A data framer 520 is provided which receives image data and associated control data from a data source (not shown), such as a graphics card, MPEG decoder, set top box, memory, etc. In the case of integration in a single chip, the source of the image data may be the output of other video processing blocks, such as the output of a video decoder, MPEG decoder, deinterlacer, scaler, or video enhancement block. The data framer 520 packs pixels according to a desired transmission standard, for example, LVDS, RSDS, or mini-LVDS.

The packed pixel data is then sent to the transmitter 530. Since the transmitter 530 may receive the pixel data from the data framer 520 in parallel communication format, the transmitter 530 may include a plurality of parallel-to-serial converters 532 configured to convert the pixel data from parallel to serial format, as is required for differential signaling in accordance with LVDS, RSDS, and mini-LVDS standards. In accordance with an aspect of the present invention, the parallel-to-serial converters 532 convert the parallel data to serial data at a rate that is 7 times or 8 times the pixel clock rate, although the effective data rate may differ as discussed in more detail below. Depending on the desired transmission format, a plurality of channel drivers 534 then transmit the pixel data via differential signaling according to the desired transmission standard either directly to the source drivers 440 or to an external panel timing controller. As will be explained in more detail below, the transmitter 530 may be configured to transmit pixel data at one particular bit rate, for example, 7 bits per clock cycle, or 8 bits per clock cycle although the effective pixel data transmission rate as seen by the receiver may differ, for example, 2 bits per clock cycle.

An integrated timing controller 540 is also provided which may generate timing/control signals that can be transmitted directly to the source drivers 440 and the gate drivers 450, thereby obviating the need for an external panel timing controller. The display system controller 410 may be configured to allow the selection of a desired transmission standard from a plurality of transmission standards for which standard-specific timing/control signals can be generated by the integrated timing controller 540, for example, RSDS or mini-LVDS.

In some embodiments, the data framer 520, the transmitter 530, and the integrated timing controller 540 may be integrated into a single processor-based circuit on a single microchip 510. This type of integrated configuration is commonly referred to as a "system on a chip." The microchip 510 may comprise a processor such as a programmable general purpose Digital Signal Processor (DSP), available from companies such as Analog Devices, Motorola, or Texas Instruments, or an application-specific DSP designed for a particular application and provided by a company such as Zoran Corporation of Sunnyvale, Calif. The microchip may also include other functionality, such as an MPEG-2 decoder, an 8VSB demodulator, and an NTSC video decoder, as in the previously mentioned SupraHD® 780 line of processors. Each of the data framer 520, the transmitter 530, and the integrated timing controller 540 may be implemented as a microcontroller or state machine on the microchip 510. In other embodiments, the data framer 520, the transmitter 530, and the integrated timing controller 540 may be implemented in software or firmware executed on a main processor, or in a combination of hardware and software (and/or firmware). The microchip 510 may further include memory components such as ROM, RAM, Flash, or other memory components known in the art. The memory components generally include a combination of RAM memory and ROM memory, but may also include other types of memory, such as flash or disk-based memory. In accordance with embodiments of the present invention, the memory components may be adapted to store instructions for the processor, as well as image data or pixel data.

The microchip 510 may further include one or more timing sources, for example, oscillators or phase-locked loops. The microchip 510 may include one or more interfaces operating according to various industry standards, for example, LVDS, RSDS, mini-LVDS, BLVDS, USB, FireWire, Ethernet, USART, SPI, HDMI, or other interfaces known in the art. The microchip 510 may also include one or more voltage regulators or power management circuits.

The display system controller 410 may be configured to format and transmit pixel data and generate timing and control schemes according to one or more transmission standards, for example, LVDS, RSDS, or mini-LVDS. This configuration may be set on the microchip 510 during or prior to its incorporation in the system 400. The display system controller 410 may require the incorporation of additional components in order to operate according to some transmission standards. For example, an external resistor (not shown) may be electrically coupled to the transmitter 530 or other component in order to bring the differential signal being transmitted into an expected range, or to achieve an expected voltage swing. In some embodiments, a different transmission standard may be set later. In other embodiments, once a transmission standard is set it cannot be changed. However, it will be appreciated that the data framer 520, the transmitter 530, and the integrated timing controller 540 are otherwise selectively configurable to operate in any one of a number of transmission standards without modification.

Referring still to FIG. 5, the data framer 520 receives the pixel image data in a parallel communication format. The data framer 520 may be provided with an associated memory, such as ROM, RAM, or Flash memory in which to store pixel data during the framing process. The data framer 520 is configured to receive the DE, HSYNC, VSYNC, and pixel clock signals and pack the pixel data into the appropriate format (LVDS, RSDS, or mini-LVDS) and pass it to the transmitter 530 for transmission according to the selected differential signaling standard in serial communication format.

Figure 6:
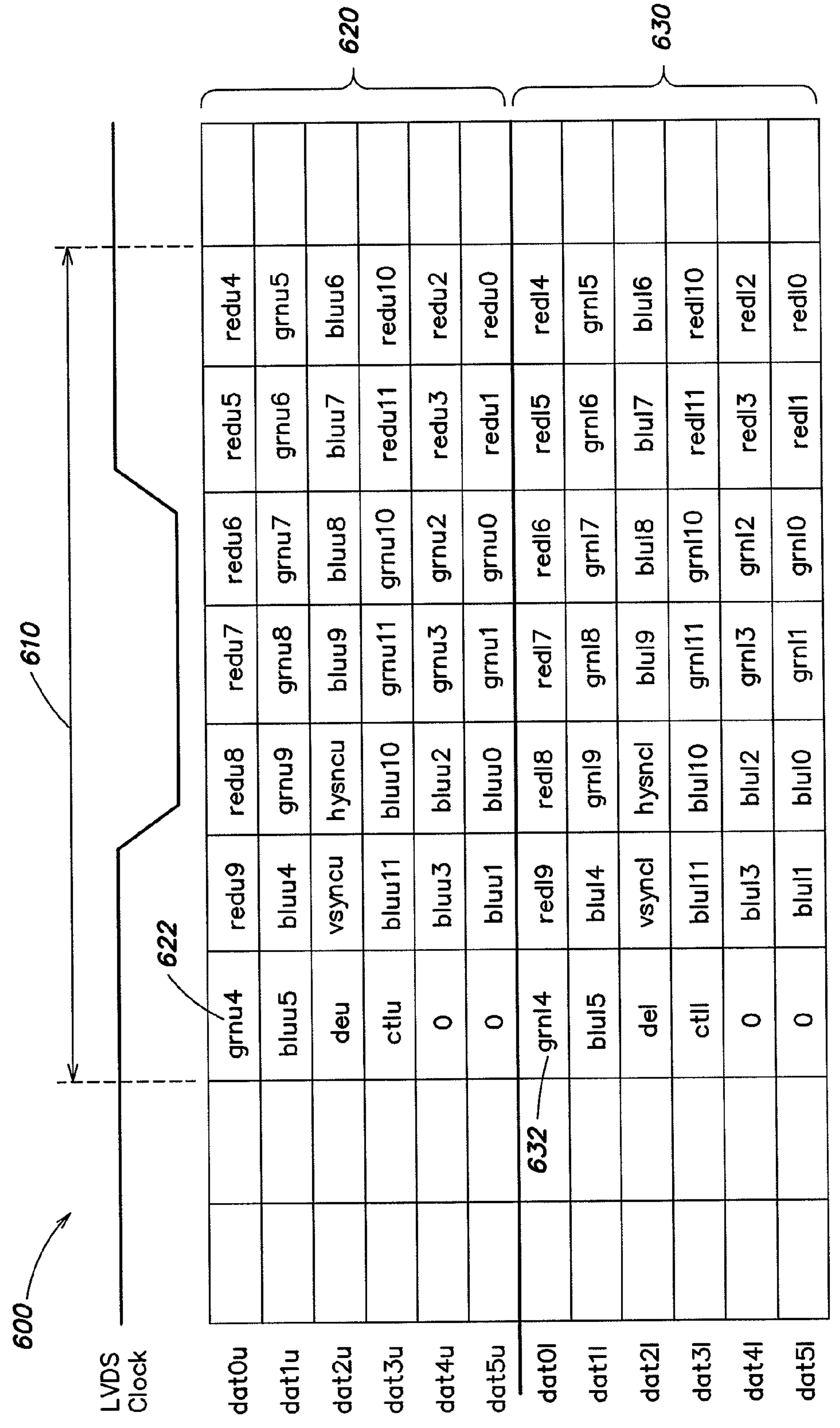
FIG. 6 illustrates an example data format in accordance with the LVDS transmission standard.

In one embodiment, the data framer 520 may be selectively configured to provide data in the LVDS format to the transmitter 530. An example of a data scheme 600 for 12-bit color pixel data in accordance with LVDS transmission standards can be seen in FIG. 6. Bits of pixel data are arranged according to the LVDS transmission standard. Pixel data for 2 pixels can be sent during one LVDS clock cycle 610. Specifically, data about one pixel can be sent over each of an upper channel 620 and a lower channel 630 during each LVDS clock cycle 610. The upper channel 620 made up of 6 data lines (dat0*u* through dat5*u*), and the lower channel 630 made up of 6 data lines (dat01 through dat51) can be seen in FIG. 6. During each LVDS clock cycle, 12 bits can be sent for each of the three RGB values associated with a pixel. For example, the fourth bit for the green value for the pixel in the upper channel 620 during the LVDS clock cycle 610 is indicated at 622. Similarly, the fourth bit for the green value for the pixel in the lower channel 630 during the LVDS clock cycle 610 is indicated at 632. Timing and control data may be packed too, for example, VSYNC, HSYNC, DE, and other control data as known in the art. For example, as shown in FIG. 6 user definable control data (ct1*u* and ct11) may be provided to indicate, for example, whether On Screen Display (OSD) is enabled or not. In some embodiments, the upper channel 620 and the lower channel 630 may be used to transmit pixel data for different regions of the panel. For example, the upper channel 620 may be used to transmit pixel data for odd-numbered columns of the panel 430, whereas the lower channel 630 may be used to transmit pixel data for even-numbered columns of the panel 430.

The data framer 520 may be configured to arrange the pixel data in the LVDS standard data format as described above and send it to the transmitter 530. In several embodiments, the transmitter 530 is an LVDS transmitter that operates in a well known manner, and is configured to transmit data at 7 bits per LVDS clock cycle via a differential signaling interface (not shown) in serial communication format. The transmitter 530 may be further configured to transmit a clocking signal to facilitate coordination or synchronization with a component receiving the pixel data. In this way, during each clock cycle 7 bits of data are transferred via the transmitter 530 operating at 7 bits per clock cycle.

In some embodiments, the data framer 520 may be selectively configured to provide data in a format operating at a different bit rate than the transmitter 530. For example, both RSDS and mini-LVDS operate at 2 bits per clock cycle. An example of a data scheme 700 for 8-bit color pixel data in accordance with mini-LVDS and RSDS transmission standards can be seen in FIG. 7.

Figure 7:
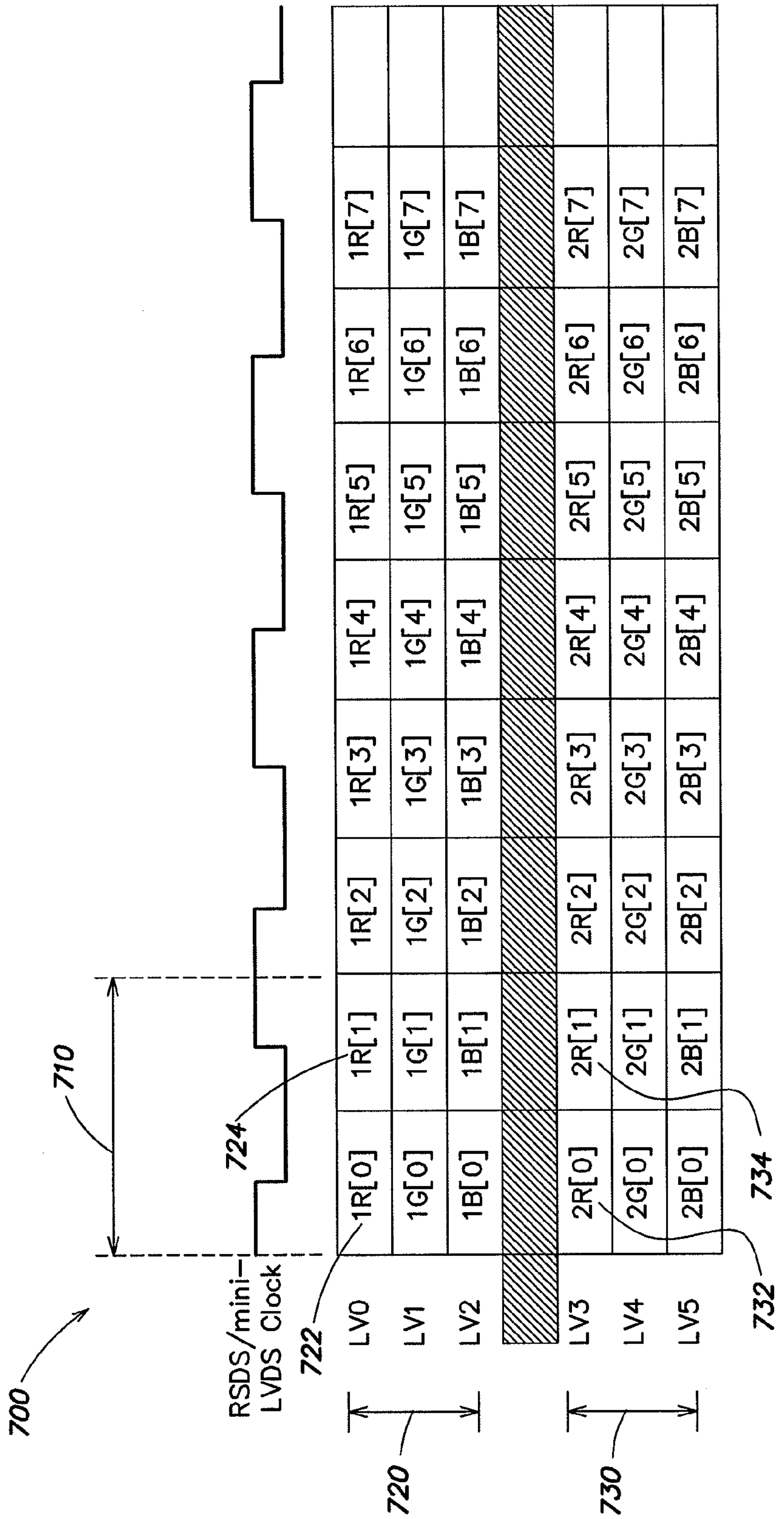
FIG. 7 depicts an example data format in accordance with the mini-LVDS transmission standard.

In the data scheme 700, bits of pixel data are arranged by the data framer 520 according to the mini-LVDS or RSDS transmission standards. As can be seen in FIG. 7, the mini-LVDS/RSDS transmission standards provide an upper channel 720 made up of 3 data lines (LV0 through LV2), and a lower channel 730 made up of 3 data lines (LV3 through LV5). Specifically, 2 bits can be sent during each RSDS or mini-LVDS clock cycle for each of the three RGB values associated with a pixel on each of the upper channel 720 and the lower channel 730. For example, the first bit (bit 0) for the red value for the pixel in the upper channel 720 is indicated at 722, and the second bit (bit 1) for the red value for the same pixel is indicated at 724. Similarly, the first bit (bit 0) for the red value for the pixel in the lower channel 730 is indicated at 732, and the second bit (bit 1) for the red value for the same pixel is indicated at 734. In this example, bits 722 and 724 are sent during one RSDS or mini-LVDS clock cycle 710 on the upper channel 720, and bits 732 and 734 are sent during the same clock cycle 710 on the lower channel 730.

In the data scheme 700 and other data schemes, the upper channel 720 and the lower channel 730 may be used to transmit pixel data for different regions of the panel 430. For example, the upper channel 720 may be used to transmit pixel data for the left side of the panel 430, whereas the lower channel 730 may be used to transmit pixel data for the right side of the panel 430.

As will be noted, the data mapping 700 includes 6 data lines divided into an upper channel 720 and a lower channel 730. In embodiments where the transmitter 520 is configured to transmit more than 6 differential signals simultaneously, more data lines and upper and lower channels may be incorporated. The exemplary embodiment seen in FIG. 5 shows a transmitter 530 configured to transmit 12 data lines. Thus, a data mapping for a mini-LVDS transmission may be able to simultaneously transmit more than one instance of data scheme 700. It is contemplated that any number of instances of data scheme 700 may be sent as is permitted by the capacity of the data framer 520 and the transmitter 530.

The data framer 520 may be configured to arrange the pixel data in the mini-LVDS or RSDS standard data format as described above and send it to the transmitter 530. In several embodiments as described above, the transmitter 530 is an LVDS transmitter that operates in a well known manner, and is configured to transmit data at 7 bits per clock cycle via a differential signaling interface (not shown) in serial communication format. However, components (such as receivers associated with the source drivers 440 and the gate drivers 450) electrically coupled to receive the mini-LVDS or RSDS data may be configured to receive the data at 2 bits per clock cycle. Several embodiments of the present invention deal with this difference in bit rates by repeating bits in order to simulate the lower bit rate when using a transmitter that operates at the higher bit rate.

Figure 8A:
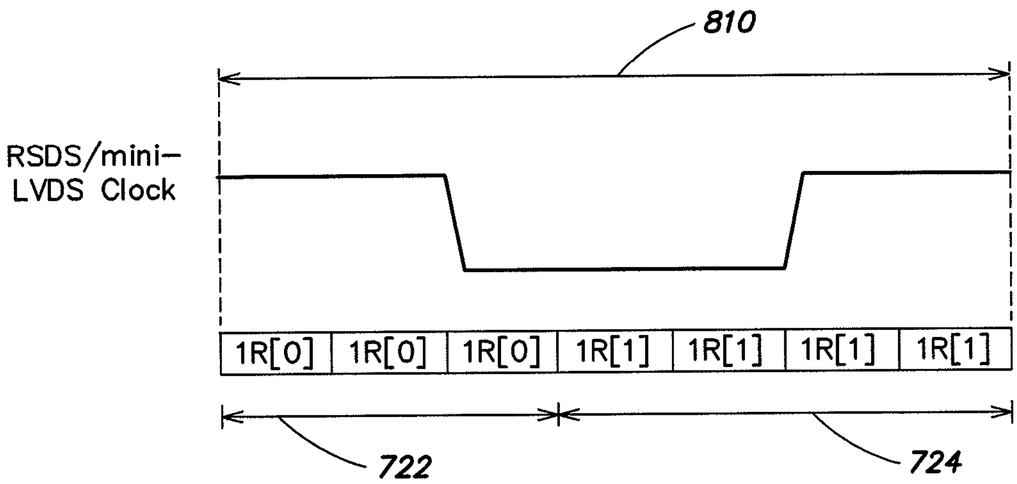
FIG. 8A depicts a method of mapping mini-LVDS or RSDS data that allows the data to be transmitted by a LVDS transmitter at 7 bits per clock cycle and received at two bits per clock cycle.

An example embodiment in which bits 722 and 724 are transferred at 7 bits per clock cycle is shown in FIG. 8A. As can be seen, the data framer 520 maps each of bits 722 and 724 multiple consecutive times during each 7 bit clock cycle. In this example, bit 722 is mapped to the first 3 bits of the clock cycle 810, and bit 724 is mapped to the remaining 4 bits of the cycle 810. The parallel-to-serial converters 532 convert the parallel pixel data to serial pixel data at a rate of 7 times the pixel clock rate, but because of the repetition of pixel data, the effective data rate is only 2 times the pixel clock rate. Thus, the transmitter 730 will transmit bit 722 for roughly the first half of the clock cycle 810, and then transmit bit 724 for roughly the second half of the clock cycle 810, thereby providing an effective transmission rate of 2 bits per clock cycle. This transmission format will allow the data to be correctly received by components configured to receive data at 2 bits per clock cycle. Such components may include the source drivers 440 and the gate drivers 450. In this way, the data framer 520 and transmitter 530 can transmit pixel data that can be received by components configured to receive data at either 7 bits per clock cycle or 2 bits per clock cycle. This can be accomplished without any physical modification to either component, and is done through the use of data mapping alone.

Figure 8B:
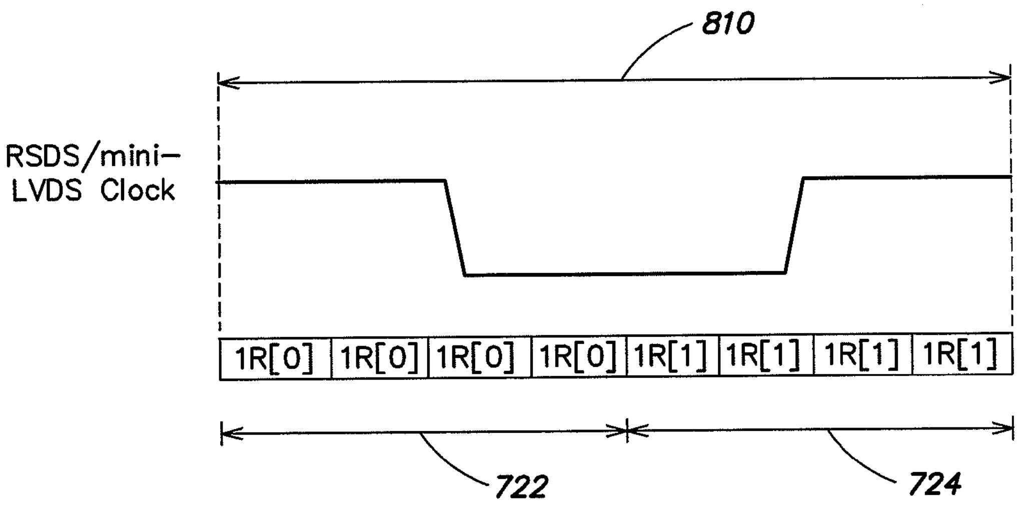
FIG. 8B depicts a method of mapping mini-LVDS or RSDS data that allows the data to be transmitted by a LVDS transmitter at 8 bits per clock cycle and received at two bits per clock cycle.

It should be noted that other variations of data mapping can be implemented and are contemplated within the scope of this disclosure. For example, in some embodiments the first bit 722 may be mapped for the first 4 bits of the 7 bit clock cycle, while the second bit 724 may be mapped for the remaining 3 bits of the cycle. In other embodiments, to achieve a 50% duty cycle, 8 bits per clock cycle may be used, in which case the first bit 722 may be mapped to the first half of the 8 bit clock cycle, and the second bit 724 may be mapped to the second half of the 8 bit clock cycle. This embodiment is depicted in FIG. 8B, wherein bit 722 is mapped to the first 4 bits of the clock cycle 810, and bit 724 is matted to the remaining 4 bits of the clock cycle 810. In this embodiment, the parallel-to-serial converters 532 convert the parallel pixel data to serial pixel data at a rate of 8 times the pixel clock rate, but because of the repetition of pixel data, the effective data rate is only 2 times the pixel clock rate. Thus, the transmitter 730 will transmit bit 722 for the first half of the clock cycle 810, and then transmit bit 724 for roughly the second half of the clock cycle 810, thereby providing an effective transmission rate of 2 bits per clock cycle with a 50% duty cycle.

It should be appreciated that the data schemes 600 and 700 are offered for exemplary purposes only, and that other data schemes may be mapped and sent in the manner described above.

Referring again to FIG. 5, the transmitter 530 is configured to receive pixel data from the data framer 520 in a parallel transmission format, transform the pixel data into serial transmission format at 7 times or 8 times the pixel clock rate, and to provide the pixel data to a plurality of channel drivers 534. The transmitter 530 is further provided with one or more clock drivers 536, similar in construction to each of the plurality of channel drivers 534, for generating the clock signal necessary for differential signaling. A plurality of channel drivers 534 are provided for sending the bits of pixel data packed by the data framer 520. The clock drivers 536 and the channel drivers 534 may be similar to the driver 12 described with respect to FIG. 1, and are electrically coupled to at least two wires in order to send differential signals as described previously. The number of clock drivers 536 and channel drivers 534 may vary depending on the configuration and intended application of the display system controller 410. The exemplary embodiment seen in FIG. 5 shows an upper channel 550 and a lower channel 560, with each of the upper and lower channel 550, 560 comprising a clock driver 536 and six channel drivers 534. When data in the LVDS format is transmitted by the transmitter 530, the upper channel 620 and the lower channel 630 of the packing scheme 600 can be sent through the upper channel 550 and the lower channel 560 of the transmitter 530, respectively. When data in the mini-LVDS or RSDS format is transmitted by the transmitter 530, one instance of the data scheme 700 can be sent through the upper channel 550 and another instance of the data scheme 700 can be sent through the lower channel 560. However, different configurations are contemplated in other embodiments, and the present mapping of channels is shown for illustrative purposes only.

The transmitter 530 may be provided with an interface (not shown) through which it can send differential signals. This interface may comprise one or more data pins that can be coupled to other components, for example, receivers associated with the source drivers 440 and the gate drivers 450. The configuration of the interface and the assignment of the data pins may vary depending on which transmission standard is selected. In some embodiments, the transmitter 530 may further transmit differential signals through the interface at a set current. In other embodiments, the current may be variable. In some embodiments, one or more external resistors may be incorporated into the interface in order to bring the voltage swings within an expected range for the chosen transmission standard.

In accordance with an embodiment of the present invention, the display system controller 410 incorporates an integrated timing controller 540 that generates timing/control signals that are necessary to control the function of the LCD panel 430 in some transmission standards. For example, pixel data sent to the source drivers 440 and the gate drivers 450 according to the RSDS or mini-LVDS standards must be accompanied by timing/control signals to ensure the pixel data is displayed correctly by the panel 430 at the correct time. Embodiments of the present invention obviate the need for an external panel timing controller by incorporating the integrated timing controller 540, which may be provided in the same circuit as the data framer 520 and the transmitter 530 on the microchip 510. The integrated timing controller 540 can be configured by being programmed through the use of programmable registers or other memory locations and logic gates to generate timing signals for a variety of panels.

In some embodiments, the integrated timing controller 540 may be configured to receive timing/control signals such from an external source, such as a graphics card, video controller, or set top box (not shown). In other embodiments, these timing/control signals may be generated on chip 510 and provided to the integrated timing controller 540 and the data framer 520. The timing/control signals that are received by the integrated timing controller 540 may include those used to provide pixel data in the LVDS transmission standard, for example, VSYNC, HSYNC, DE, and the pixel clock signal, or other timing/control signals. These timing/control signals can then be used to generate other timing/control signals that can be directly sent to the source drivers 440 and the gate drivers 450 without the use of an external panel timing controller. These signals can be used to correctly time the display of pixel data sent from the transmitter 530 to the panel 430 when the pixel data is sent in a transmission standard such as RSDS or mini-LVDS.

Figure 9:
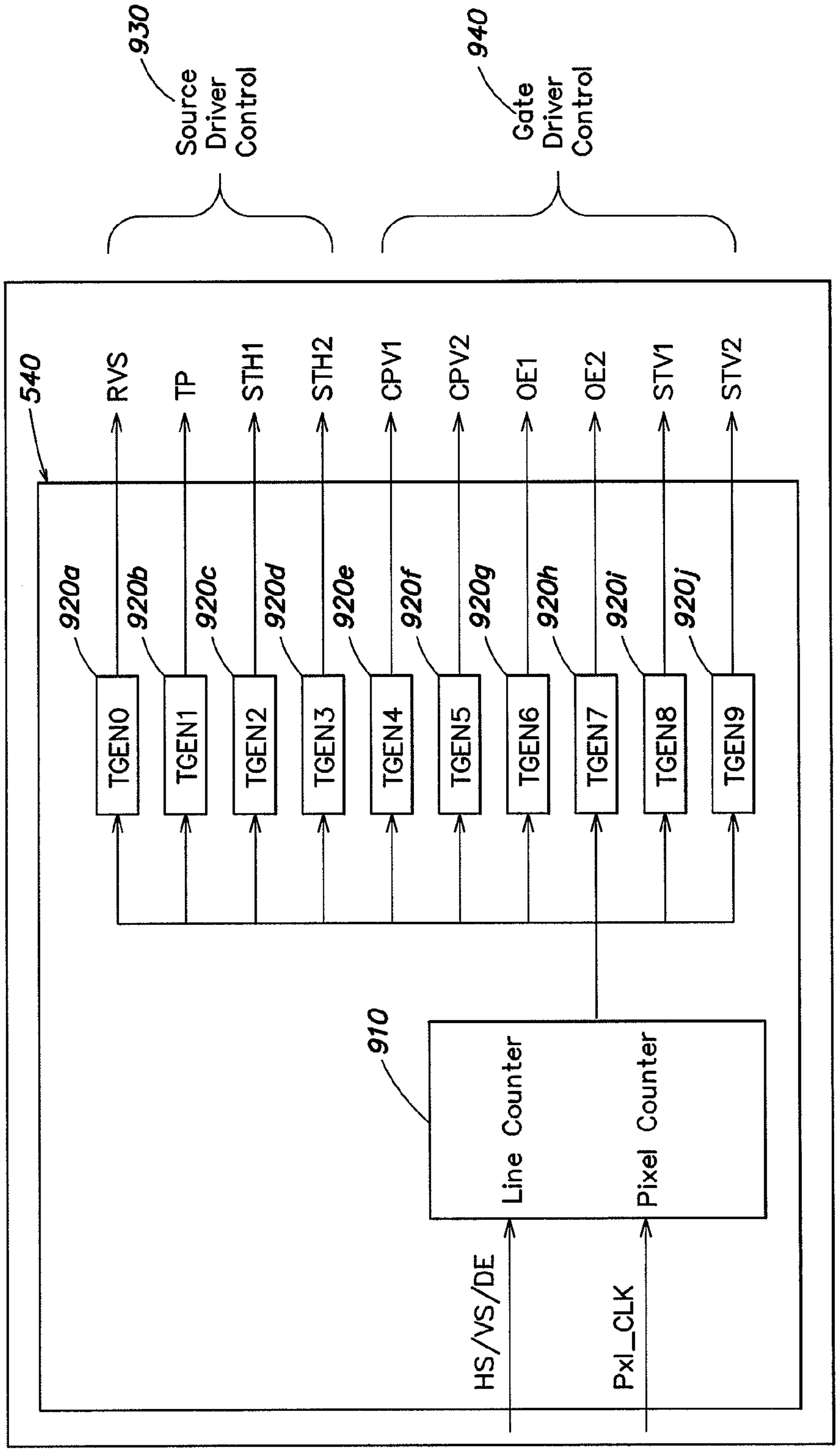
FIG. 9 is a more detailed functional block diagram of the integrated timing controller depicted in FIG. 5.

FIG. 9 shows a more detailed functional block diagram of the integrated timing controller 540 described previously with respect to FIG. 5. The integrated timing controller 540 receives timing and control data, such as HSYNC, VSYNC, DE, and a pixel clock signal from a graphics card, a set top box, an MPEG decoder, or other circuit internal or external to the chip 510 and provides a plurality of timing and control signals capable of directly driving the source and gate drivers 440, 450 in accordance with either the mini-LVDS or RSDS standards. As described more fully with respect to FIG. 10, the integrated timing controller 540 includes a counter circuit 910 and a plurality of programmable timing control circuits 920*a-j*. The counter circuit 910 includes a line counter circuit 1010 that counts the number of lines in a frame of data and a pixel counter circuit 1012 that counts the number of pixels on a line. Each of the plurality of programmable timing control circuits 920*a-j* are fully programmable and capable of generating the timing and control signals necessary to drive the source and gate drivers in accordance with the mini-LVDS or RSDS standards.

Each of the timing control circuits 920*a-j* is responsible for providing a single source or gate driver control signal, STH, STV, CPV, OE, etc., whose starting point (e.g., the point in time at which the signal is asserted) and width (and/or assertion level) is fully programmable. These timing/control signals may include the signals identified in FIG. 11, such as source driver control signals 930 and gate driver control signals 940. The source driver control signals 930 may include a Reverse/Polarity Control (RVS, REV or POL) signal, a Transfer/load Pulse (TP or LOAD) signal, and a Start Pulse Horizontal (STH) signal STH1. A second Start Pulse Horizontal STH2 signal is included to permit the integrated timing controller 540 to be used with a wide variety of displays that may require the use of a second STH signal. The gate driver control signals 940 may include a Clock Pulse Vertical (CPV) signal CPV1, an Output Enable (OE or ROE) signal OE1 or ROE1, and a Start Pulse Vertical (STV) signal STV1. A second Start Pulse Vertical signal (STV2), second Output Enable signal OE2 and second Clock Pulse Vertical signal CPV2 are also included for those panels that might require additional control signals. It should be appreciated that other control signals, such as one or more general purpose output signals may additionally be provided.

Figure 10:
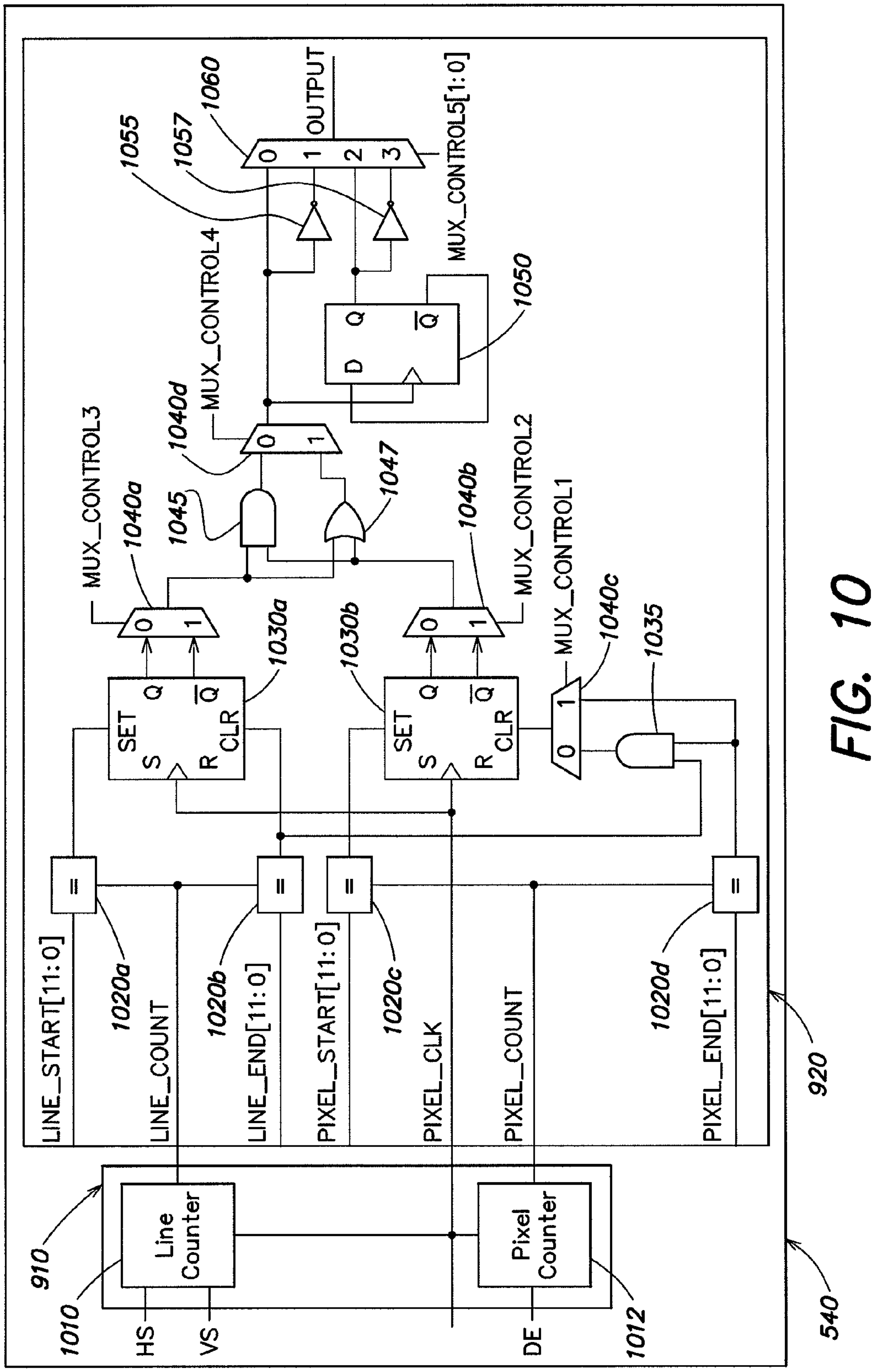
FIG. 10 is a more detailed functional block diagram of the counter circuit and a programmable timing control circuit depicted in FIG. 9.

FIG. 10 is a more detailed functional block diagram illustrating the counter circuit 910 and an exemplary programmable timing control circuit 920 in accordance with an embodiment of the present invention. As shown, the counter circuit 910 includes a line counter circuit 1010 and a pixel counter circuit 1012. The line counter circuit 1010 and pixel counter circuit 1012 each receives the pixel clock signal (denoted Pxl_CLK in FIG. 9, but denoted as PIXEL_CLK in FIG. 10). The line counter 1010 additionally receives the signals HSYNC and VSYNC (denoted HS and VS in FIG. 10, respectively) and the pixel counter 1012 additionally receives the Data Enable signal DE. During the period in which the DE signal is asserted, the pixel counter 1012 increments with each cycle of the PIXEL_CLK signal and is reset by de-assertion of the DE signal. During the period in which the VS signal is asserted, the line counter 1010 increments with each assertion of the HS signal, and is reset by de-assertion of the VS signal.

Figure 12:
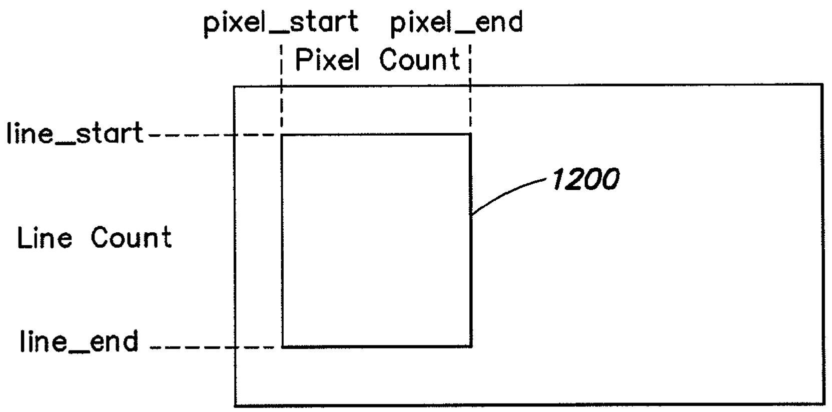
FIG. 12 graphically depicts a viewable area of an LCD display.
Figure 13:
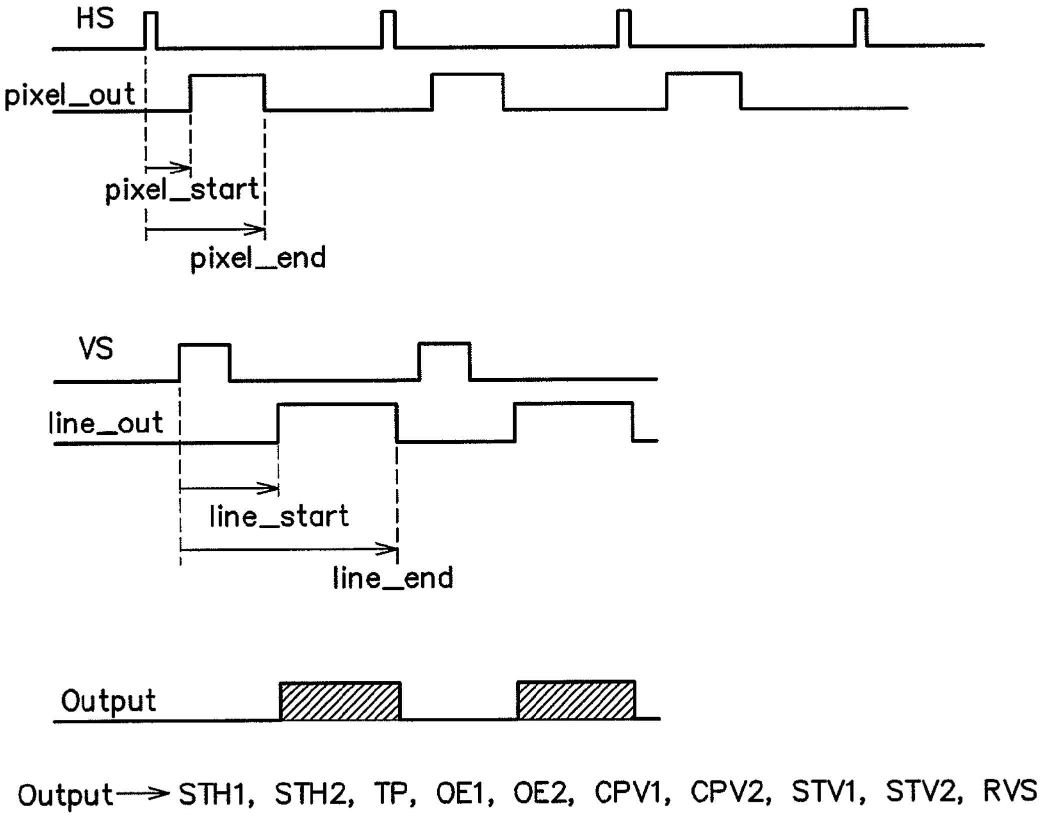
FIG. 13 illustrates the relation between the start and end of pixel and line data relative to Horizontal and Vertical synchronization signals.
Figure 14:
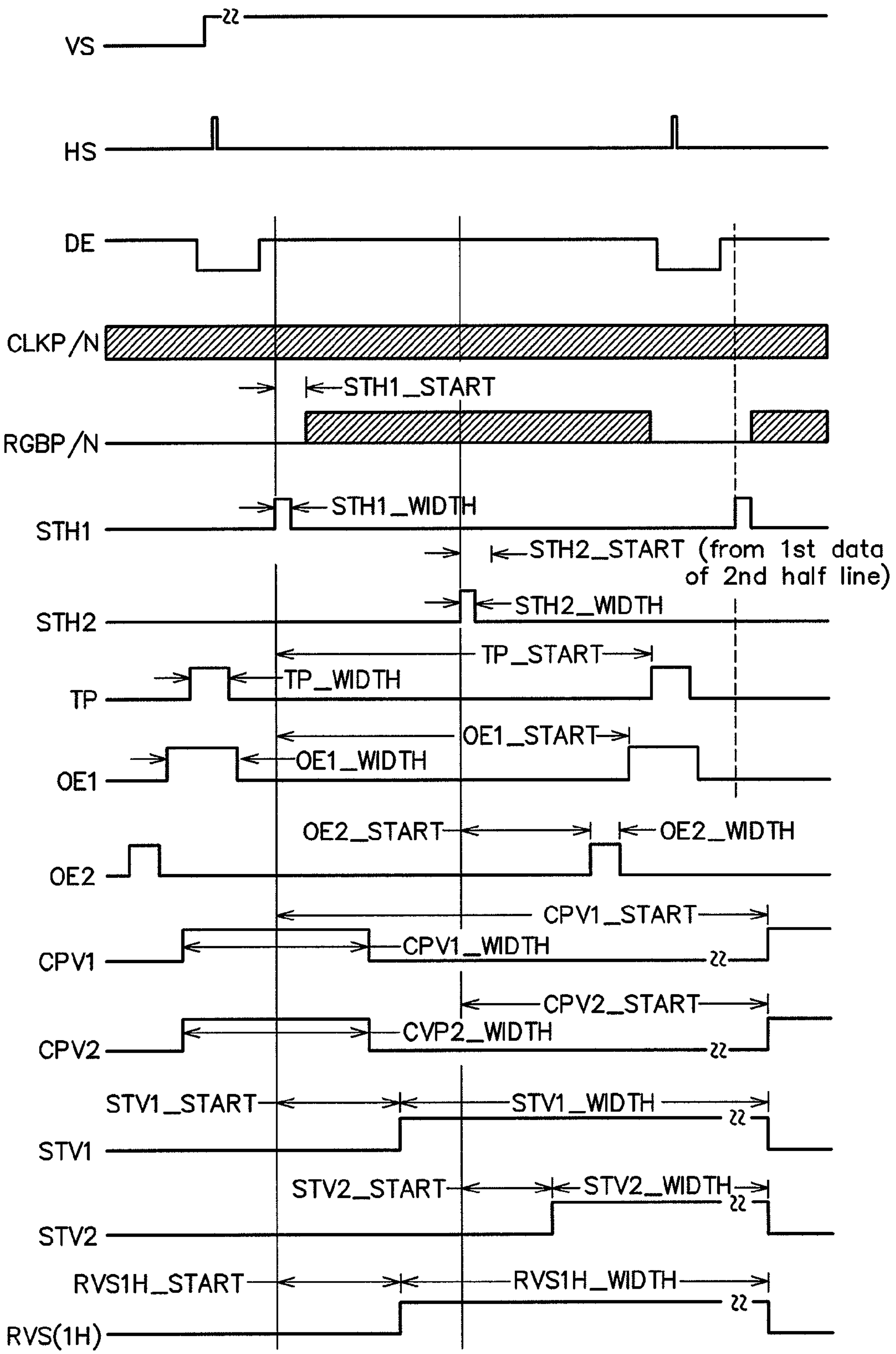
FIG. 14 illustrates the various timing and control signals provided by the integrated timing controller of FIG. 9.

Each programmable timing control circuit 920 includes a plurality of programmable comparators 1020*a-d*, a plurality of Set/Reset (SR) flip-flops 1030*a-b* that are clocked by the PIXEL_CLK signal, a plurality of two input multiplexers 1040*a-d*, a D-type flip-flop 1050, an output multiplexer 1060, and some associated logic gates 1035, 1045, 1047, 1055, and 1057. Each of the programmable comparators 1020*a-d* receives a 12 bit programmable value that is compared to the input of the comparator. For example, comparator 1020*a* receives a programmable LINE_START value which indicates the starting line of the display at which a first control signal is to be asserted, comparator 1020*b* receives a programmable LINE_END value which indicates the ending line of the display at which the first control signal is to be deasserted, comparator 1020*c* receives a programmable PIXEL_START value which indicates the starting pixel of the display at which a second control signal is to be asserted, and comparator 1020*d* receives a programmable PIXEL_END value which indicates the ending pixel of the display at which the second control signal is to be deasserted. An output control signal designated "output" in FIG. 10 (e.g., a source driver control signal 930 or a gate driver control signal 940) is a selective Boolean combination of the first and second control signals in 920. These control signals are sent to the source drivers and the gate drivers which control the display device based upon the configured size of display. The use of programmable values for LINE_START, LINE_END, PIXEL_START, and PIXEL_END allows the integrated timing controller 540 to be used with different sizes and types of displays, such that the start and end of displayable pixel data may be customized to suit a particular type or size of display, simply by changing these programmable values. This is indicated graphically in FIG. 12 wherein the viewable area 1200 of the display is shown, and wherein the LINE_START, LINE_END, PIXEL_START, and PIXEL_END values are shown for a particular type and size of display. It should be noted that by adjusting the LINE_START, LINE_END, PIXEL_START, and PIXEL_END values, smaller or larger viewable areas 1200 may be accommodated. FIG. 13 illustrates the relationship between the start and end of pixel data (pixel_out) relative to HS and the PIXEL_START and PIXEL_END values, and also illustrates the relationship of start and end of lines of pixel data relative to VS and the LINE_START and LINE_END values.

During operation of the programmable timing control circuit 920, the output of the line counter 1010 (LINE_COUNT) is compared to the LINE_START and LINE_END values by the comparator 1020*a* and 1020*b*. When the output of the line counter 1010 (LINE_COUNT) is equal to the LINE_START value, SR flip-flop 1030*a* is set by the output of comparator 1020*a*, and when the output of the line counter 1010 (LINE_COUNT) is equal to the LINE_END value, SR flip-flop 1030*a* is reset or cleared by the output of comparator 1020*b*. Similarly, during operation, the output of the pixel counter 1012 (PIXEL_COUNT) is compared to the PIXEL_START and PIXEL_END values by the comparators 1020*c* and 1020*d*. When the output of the pixel counter 1012 (PIXEL_COUNT) is equal to the PIXEL_START value, SR flip-flop 1030*b* is set by the output of comparator 1020*c*. SR flip-flop 1030*b* may be reset or cleared based upon the output of comparator 1020*d*, or based upon the output of comparators 1020*d* and 1020*b*. For example, based upon a state of the MUX_CONTROL1 signal provided to multiplexer 1040*c*, one of the two inputs (designated 0 and 1 in FIG. 10) of the multiplexer 1040*c* is selected to provide an output signal to the reset or clear input of the SR flip-flop 1030*b*. When the input designated 1 is selected, SR flip-flop 1030*b* is reset or cleared based only upon the output of the comparator 1020*d* (i.e., the output of the pixel counter 1012 (PIXEL_COUNT) being equal to the PIXEL_END value). Alternatively, when the input designated 0 is selected, SR flip-flop 1030*b* is reset or cleared based upon a logical AND of the output of the comparator 1020*d* and the output of comparator 1020*b* (i.e., the output of the pixel counter 1012 (PIXEL_COUNT) being equal to the PIXEL_END value and the output of the line counter 1010 (LINE_COUNT) being equal to the LINE_END value) based upon the output of AND gate 1035.

Multiplexer control signals MUX_CONTROL3 and MUX_CONTROL2 are used to select which of the outputs of the SR flip-flops 1030*a* and 1030*b* are provided to the output of the multiplexers 1040*a*, and 1040*b*, respectively. For example, when the input designated 0 of multiplexer 1040*a* is selected, the non-inverting output Q of the SR flip-flop 1030*a* is provided to the output of the multiplexer 1040*a*, and when the input designated 1 of multiplexer 1040*a* is selected, the inverting output $\overline{Q}$ of the SR flip-flop 1030*a* is provided to the output of the multiplexer 1040*a*. Multiplexer 1040*b* operates in a similar manner to select one of the non-inverting output or the inverting output of the SR flip-flop 1030*b*. The use of multiplexers 1040*a* and 1040*b* thus permits selection of the assertion level of the signal provided to the output of each respective multiplexer 1040*a*, 1040*b*.

Multiplexer control signal MUX_CONTROL4 is used to select the type of logic function to be applied to the output signals provided by multiplexers 1040*a* and 1040*b*. For example, when the input designated 0 of multiplexer 1040*d* is selected, the output of the multiplexer 1040*d* reflects a logical AND of the output signals provided by multiplexers 1040*a* and 1040*b* based upon the presence of AND gate 1045, and when the input designated 1 of multiplexer 1040*d* is selected, the output of the multiplexer 1040*d* reflects the logical OR of the output signals provided by multiplexers 1040*a* and 1040*b* based upon the presence of OR gate 1047.

Multiplexer control signal MUX_CONTROL5 is a 2-bit control signal used to select one of the four inputs (designated inputs 0 through 3) of multiplexer 1060 to provide to the output of the multiplexer. In response to a first value of the control signal MUX_CONTROL5 that selects the input designated 0, the multiplexer 1060 simply provides the output of multiplexer 1040*d* to the output of multiplexer 1060, and in response to a second value of the control signal MUX_CONTROL5 that selects the input designated 1, the multiplexer 1060 provides the logical opposite of output of multiplexer 1040*d* to the output of multiplexer 1060, based upon the inversion performed by inverter 1055. In response to a third value of the control signal MUX_CONTROL5 that selects the input designated 2, the multiplexer 1060 provides the output of D-type flip-flop 1050 to the output of multiplexer 1060, and in response to a fourth value of the control signal MUX_CONTROL5 that selects the input designated 3, the multiplexer 1060 provides the logical opposite of the output of D-type flip-flop 1050 to the output of multiplexer 1060 based upon the inversion performed by inverter 1057. D-type flip-flop 1050 is used to control de-assertion of the control signal (e.g., RVS, STH1, CPV1, OE1) provided by the output of multiplexer 1060. Depending upon the state of the multiplexer control signals MUX_CONTROL1-MUX_CONTROL5, the assertion level of the control signal provided by the output of multiplexer 1060, the point in time at which the control signal provided by the output of multiplexer 1060 is asserted, and the width of the control signal provided by the output of multiplexer 1060 may be adjusted to the requirements of the particular model of display panel being used.

In some embodiments, the display system controller 410 or the integrated timing controller 540 may be configured to receive or store one or more parameters relating to the details of the panel 430 incorporated in the system 400. These parameters may be necessary to calculate the timing scheme for the panel 430, since panels having different dimensions or other characteristics may require the source drivers 440 and the gate drivers 450 of the panel 430 to delay different amounts of time in order to synchronize and transmit the pixel data that will be displayed on the panel 430. In some embodiments these parameters may describe the dimensions of the panel 430, for example, the number of rows and columns in which the panel 430 is capable of displaying pixel data. In other embodiments, these parameters may include actual timing values, for example, the number of clock cycles that the source drivers 540 and the gate drivers 550 should wait before causing some portion of the pixel data to be displayed on the panel 430.

In still other embodiments, the display system controller or the integrated timing controller 540 may store dimensions and/or timing values relating to several different known LCD display panel configurations. This data may be stored in a memory component known in the art, for example, ROM, RAM, or Flash memory. In these embodiments, the one or more parameters may identify which panel configuration should be used by the integrated timing controller 540 in calculating a timing scheme. In other embodiments where timing values relating to several different panel configurations are stored, the integrated timing controller 540 may be able to detect which panel configuration is to be used through communication with the panel 430 or another component of the display system.

The parameters and/or the stored panel configuration can then be used, along with the other timing/control data (such as VSYNC, HSYNC, DE, and the pixel clock signals) received by the integrated timing controller 540 to generate timing signals that can be transmitted to the source drivers 440 and the gate drivers 450. These timing signals may be generated for any of a number of transmission standards, for example, RSDS or mini-LVDS. In some embodiments, timing signals will not be generated if a transmission standard is selected that does not require the integrated timing controller 540 to generate timing signals. For example, if the LVDS transmission standard is selected, the transmitter 530 may send the pixel data and associated control and clock values (such as HSYNC, VSYNC, DE, and LVDS clock) directly to an external timing controller which will generate its own timing signals. In some embodiments, the integrated timing controller 540 will be inoperative where a transmission standard has been selected that makes it unnecessary. In other embodiments, the integrated timing controller 540 may generate timing signals which are ignored or not received by other components in the system.

Having now described some illustrative aspects of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention.

What is claimed is:

1. A television display system comprising:

a display system controller configured to receive pixel data and pixel timing and control signals, and responsive to a pixel data format corresponding to a selected communication standard of a plurality of differential signaling communication standards that includes LVDS and at least one of RSDS and mini-LVDS, to provide formatted pixel data that is formatted according to the pixel data format of said selected communication standard;

a data framer configured to format the pixel data along with the pixel timing and control signals according to the pixel data format of LVDS responsive to LVDS being said selected communication standard, the data framer being configured to receive the pixel data and the pixel timing and control signals and to format only the pixel data according to the pixel data format of RSDS and mini-LVDS responsive to the selected one of RSDS and mini-LVDS being said selected communication standard;

a transmitter configured to receive the formatted pixel data, and to transmit the formatted pixel data for receipt according to a pixel data rate corresponding to said selected communication standard; and an integrated timing controller configured to receive the pixel timing and control data, and responsive to said selected communication standard being one of RSDS and mini-LVDS, to generate pixel display timing and control signals to display the formatted pixel data at the pixel data rate corresponding to said selected communication standard on a television display;

wherein the data framer is further configured to format the pixel data at the pixel data rate of LVDS responsive to any one of LVDS, RSDS, and mini-LVDS being said selected communication standard, and to repeat each bit of the pixel data during formatting of the pixel data according to the pixel data format of RSDS and mini-LVDS responsive to the selected one of RSDS and mini-LVDS being said selected communication standard to provide an effective pixel data rate that is received according to the pixel data rate of the selected one of RSDS and mini-LVDS.

2. The television display system of claim 1, wherein the display system controller, the transmitter, and the integrated timing controller are implemented on a single integrated circuit.

3. The television display system of claim 2, wherein the plurality of differential signaling communication standards includes LVDS, RSDS, and mini-LVDS.

4. The television display system of claim 3, wherein the transmitter includes a plurality of drivers, the plurality of drivers including a first plurality of channel drivers configured to transmit the formatted pixel data for receipt according to the pixel data rate of LVDS responsive to LVDS being said selected communication standard, the first plurality of channel drivers being instead configured to transmit the formatted pixel data for receipt according to the pixel data rate of RSDS and mini-LVDS responsive to one of RSDS and mini-LVDS being said selected communication standard.

5. The television display system of claim 4, wherein the plurality of drivers includes at least one clock driver, the at least one clock driver being configured to transmit a clock signal having a clock rate that is one seventh the pixel data rate of LVDS responsive to any one of LVDS, RSDS and mini-LVDS being said selected communication standard.

6. The television display system of claim 4, wherein the plurality of drivers includes at least one clock driver, the at least one clock driver being configured to transmit a clock signal having a clock rate that is one eighth the pixel data rate of LVDS responsive to any one of LVDS, RSDS and mini-LVDS being said selected communication standard.

7. The television display system of claim 1, wherein the transmitter further includes a plurality of parallel to serial converters, each of the plurality of parallel to serial converters being coupled to a respective channel driver of the first plurality of channel drivers, each respective channel driver being configured to receive the formatted pixel data in a parallel data format and to convert the formatted pixel data to a serial data format at a rate that is eight times the data rate of LVDS responsive to any one of LVDS, RSDS, and mini-LVDS being said selected communication standard.

8. The television display system of claim 7, wherein the integrated timing controller includes:

a counter circuit to receive the pixel timing and control signals and to provide a line count signal and a pixel count signal, the line count signal identifying a line of the television display at which the formatted pixel data is to be displayed and the pixel count signal identifying pixel position of the television display at which the formatted pixel data is to be displayed; and a plurality of programmable timing control circuits, coupled to the counter circuit each to receive the line count signal and the pixel count signal, the plurality of programmable timing control circuits including a first plurality of programmable timing control circuits for respectively providing a respective one of a plurality of source driver timing and control signals to the television display based upon the line count signal and the pixel count signal, and a second plurality of programmable timing control circuits for respectively providing a respective one of a plurality of gate driver timing and control signals to the television display based upon the line count signal and the pixel count signal.

9. The television display system of claim 8, wherein an assertion level, an assertion time, and an assertion width of each respective one of the plurality of source driver timing and control signals and each respective one of the plurality of gate driver timing and control signals is programmable.

10. The television display system of claim 9, wherein each of the plurality of programmable timing control circuits receives a programmable line start value, a programmable line end value, a programmable pixel start value, and a programmable pixel end value, the programmable line start value identifying a first line of the television display at which a first control signal is to be asserted, the programmable line end value identifying a last line of the television display at which the first control signal is to be deasserted, the programmable pixel start value identifying a first pixel position of the television display at which a second control signal is to be asserted, and the programmable pixel end value identifying a last pixel position of the television display at which the second control signal is to be deasserted, and wherein an output of each respective programmable timing control circuit is a selective Boolean combination of the first and second control signals.

11. The television display system of claim 1, wherein the transmitter includes a plurality of drivers, the plurality of drivers including a first plurality of channel drivers configured to transmit the formatted pixel data for receipt according to the pixel data rate of LVDS responsive to LVDS being said selected communication standard, the first plurality of channel drivers being instead configured to transmit the formatted pixel data for receipt according to the pixel data rate of RSDS and mini-LVDS responsive to one of RSDS and mini-LVDS being said selected communication standard.

12. The television display system of claim 1, wherein the transmitter includes at least one clock driver, the at least one clock driver being configured to transmit a clock signal having a clock rate that is one seventh the pixel data rate of LVDS responsive to any one of LVDS, RSDS and mini-LVDS being said selected communication standard.

13. The television display system of claim 1, wherein the transmitter includes at least one clock driver, the at least one clock driver being configured to transmit a clock signal having a clock rate that is one eighth the pixel data rate of LVDS responsive to any one of LVDS, RSDS and mini-LVDS being said selected communication standard.

14. The television display system of claim 1, wherein the integrated timing controller includes:

a counter circuit to receive the pixel timing and control signals and to provide a line count signal and a pixel count signal, the line count signal identifying a line of the television display at which the formatted pixel data is to be displayed and the pixel count signal identifying pixel position of the television display at which the formatted pixel data is to be displayed; and a plurality of programmable timing control circuits, coupled to the counter circuit each to receive the line count signal and the pixel count signal, the plurality of programmable timing control circuits including a first plurality of programmable timing control circuits for respectively providing a respective one of a plurality of source driver timing and control signals to the television display based upon the line count signal and the pixel count signal, and a second plurality of programmable timing control circuits for respectively providing a respective one of a plurality of gate driver timing and control signals to the television display based upon the line count signal and the pixel count signal.

15. A method of displaying an image comprising acts of:

receiving pixel data and pixel timing and control signals corresponding to the image;

formatting, responsive to selection of LVDS from a plurality of differential signaling communication standards that includes LVDS and a least one of RSDS and mini-LVDS, the pixel data along with the pixel timing and control signals according to the pixel data format of said selected communication standard; and;

formatting, responsive to selection of one of RSDS and mini-LVDS from the plurality of differential signaling communication standards, only the pixel data according to the pixel data format of said selected communication standard;

transmitting the formatted pixel data for receipt according to a pixel data rate corresponding said selected communication standard; and generating, responsive to said selected communication standard being one of RSDS and mini-LVDS, pixel display timing and control signals to display the formatted pixel data at the pixel data rate corresponding to said selected communication standard on a television display;

wherein each of the acts of formatting includes formatting the pixel data for transmission at the pixel data rate of LVDS, and wherein the act of formatting only the pixel data includes repeating each bit of the pixel data a plurality of times during the act of formatting only the pixel data to provide an effective pixel data rate that is received according to the pixel data rate of RSDS and mini-LVDS.

16. The method of claim 15, wherein the act of formatting includes an act of:

formatting, responsive to selection of the communication standard from a plurality of differential signaling communication standards that includes LVDS, RSDS, and mini-LVDS, the pixel data according to a pixel data format of said selected communication standard.

17. The method of claim 16, wherein the act of transmitting includes acts of:

transmitting the formatted pixel data for receipt according to the pixel data rate of LVDS in response to LVDS being said selected communication standard; and transmitting the formatted pixel data for receipt according to the pixel data rate of RSDS and mini-LVDS in response to one of RSDS and mini-LVDS being said selected communication standard.

18. The method of claim 17, wherein the act of transmitting the formatted pixel data for receipt according to the pixel data rate of LVDS in response to LVDS being said selected communication standard includes transmitting a first portion of the formatted pixel data for receipt according to the pixel data rate of LVDS using a first channel driver, and wherein the act of transmitting the formatted pixel data for receipt according to the pixel data rate of RSDS and mini-LVDS in response to one of RSDS and mini-LVDS being said selected communication standard includes transmitting a second portion of the formatted pixel data for receipt according to the pixel data rate of RSDS and mini-LVDS using the first channel driver.

19. The method of claim 18, further comprising an act of:

transmitting a clock signal having a clock rate that is one seventh the pixel data rate of LVDS in response to any one of LVDS, RSDS and mini-LVDS being said selected communication standard.

20. The method of claim 18, further comprising an act of:

transmitting a clock signal having a clock rate that is one eighth the pixel data rate of LVDS in response to any one of LVDS, RSDS and mini-LVDS being said selected communication standard.

21. The method of claim 15, further comprising an act of:

converting the formatted pixel data in a parallel data format to a serial data format at a rate that is eight times the pixel data rate of LVDS responsive to any one of LVDS, RSDS, and mini-LVDS being said selected communication standard.

22. The method of claim 21, further comprising an act of:

receiving a plurality of parameters corresponding to a viewable area of the television display;

wherein the act of generating includes an act of generating, responsive to said selected communication standard being one of RSDS and mini-LVDS, the pixel display timing and control signals to display the formatted pixel data at the pixel data rate corresponding to said selected communication standard on a television display based upon the plurality of parameters corresponding to the viewable area of the television display.

* * * * *